(12) United States Patent
Hoggarth et al.

(10) Patent No.: US 10,742,967 B2
(45) Date of Patent: Aug. 11, 2020

(54) HOLOGRAPHIC DISPLAY SYSTEM

(71) Applicant: FORD GLOBAL TECHNOLOGIES, LLC, Dearborn, MI (US)

(72) Inventors: Marcus Hoggarth, St Albans Herts (GB); Jasper Dekker, Brenthouse Road London (GB); Edward Rose, London (GB)

(73) Assignee: Ford Global Technologies, LLC, Deaborn, MI (US)

( * ) Notice: Subject to any disclaimer, the term of this patent is extended or adjusted under 35 U.S.C. 154(b) by 61 days.

(21) Appl. No.: 15/668,884

(22) Filed: Aug. 4, 2017

(65) Prior Publication Data

US 2018/0041753 A1    Feb. 8, 2018

(30) Foreign Application Priority Data

Aug. 4, 2016 (GB) .................................. 1613474.4

(51) Int. Cl.
*G06T 7/70* (2017.01)
*H04N 13/388* (2018.01)
(Continued)

(52) U.S. Cl.
CPC .......... *H04N 13/388* (2018.05); *B60K 35/00* (2013.01); *B60K 37/02* (2013.01); *B60R 1/00* (2013.01); *B62D 1/046* (2013.01); *G02B 5/32* (2013.01); *G06F 1/1601* (2013.01); *G06F 3/011* (2013.01); *G06F 3/013* (2013.01); *G06F 3/016* (2013.01); *G06K 9/00791* (2013.01); *G06T 7/70* (2017.01); *H04N 9/317* (2013.01); *H04N 9/3129* (2013.01); *H04N 9/3147* (2013.01); *H04N 9/3161* (2013.01); *H04N 9/3194* (2013.01); *B60K 2370/155* (2019.05); *B60K 2370/29* (2019.05); *B60K 2370/334* (2019.05); *B60K 2370/782* (2019.05); *B60R 2300/8086* (2013.01)

(58) Field of Classification Search
CPC ........... G06F 3/011; B62D 1/18; B62D 1/181; B62D 1/183
See application file for complete search history.

(56) References Cited

U.S. PATENT DOCUMENTS 2,436,153 A * 2/1948 Sanmori .................. B62D 1/18
                                                  280/775
2,978,055 A * 4/1961 Barenyi .................... B60J 1/02
                                                  180/78

(Continued)

FOREIGN PATENT DOCUMENTS

GB         2211646 A       5/1989
JP         S62143084 A     6/1987
(Continued)

*Primary Examiner* — Olga V Merkoulova
(74) *Attorney, Agent, or Firm* — Frank MacKenzie; Brooks Kushman PC

(57) ABSTRACT

A display system for a motor vehicle is provided. The display system comprises a holographic projector assembly and a steering wheel assembly. The steering wheel assembly includes a ring-shaped member configured to be held by a driver of the vehicle and rotated about a central axis in order to steer the vehicle. The holographic projector assembly is configured to produce a holographic image inside a central region about which the ring-shaped member circumferentially extends.

18 Claims, 5 Drawing Sheets

(51) Int. Cl.
  *G06F 1/16*  (2006.01)
  *G02B 5/32*  (2006.01)
  *G06F 3/01*  (2006.01)
  *H04N 9/31*  (2006.01)
  *B60K 37/02* (2006.01)
  *B60K 35/00* (2006.01)
  *B60R 1/00*  (2006.01)
  *B62D 1/04*  (2006.01)
  *G06K 9/00*  (2006.01)

(56) References Cited

U.S. PATENT DOCUMENTS

| | | | | |
|---|---|---|---|---|
| 3,078,945 | A * | 2/1963 | Frey | B62D 1/183 |
| | | | | 180/271 |
| 3,421,386 | A * | 1/1969 | Sippel | B62D 1/183 |
| | | | | 74/493 |
| 3,487,711 | A * | 1/1970 | Sippel | B60Q 1/425 |
| | | | | 74/493 |
| 4,826,234 | A * | 5/1989 | Komatsu | B62D 1/16 |
| | | | | 296/70 |
| 6,373,472 | B1 * | 4/2002 | Palalau | B60K 37/02 |
| | | | | 345/173 |
| 6,714,327 | B1 * | 3/2004 | Abersfelder | B60K 35/00 |
| | | | | 345/9 |
| 2005/0195455 | A1 * | 9/2005 | Bruegl | G02B 27/0103 |
| | | | | 359/13 |
| 2008/0013080 | A1 * | 1/2008 | Rogitz | G01C 21/20 |
| | | | | 356/139.01 |
| 2010/0253918 | A1 * | 10/2010 | Seder | G01S 13/723 |
| | | | | 353/13 |
| 2016/0362117 | A1 * | 12/2016 | Kaufmann | B60W 50/10 |
| 2016/0364003 | A1 * | 12/2016 | O'Brien | G06F 3/017 |
| 2017/0215267 | A1 * | 7/2017 | Abe | H05G 2/006 |
| 2018/0147985 | A1 * | 5/2018 | Brown | G03B 21/20 |

FOREIGN PATENT DOCUMENTS

| | | |
|---|---|---|
| JP | S62218242 A | 9/1987 |
| JP | H01229730 A | 9/1989 |
| JP | H02197429 A | 8/1990 |
| JP | 2015125377 A | 7/2015 |
| KR | 1020150072206 A | 8/2017 |
| WO | 198805175 A1 | 7/1988 |

* cited by examiner

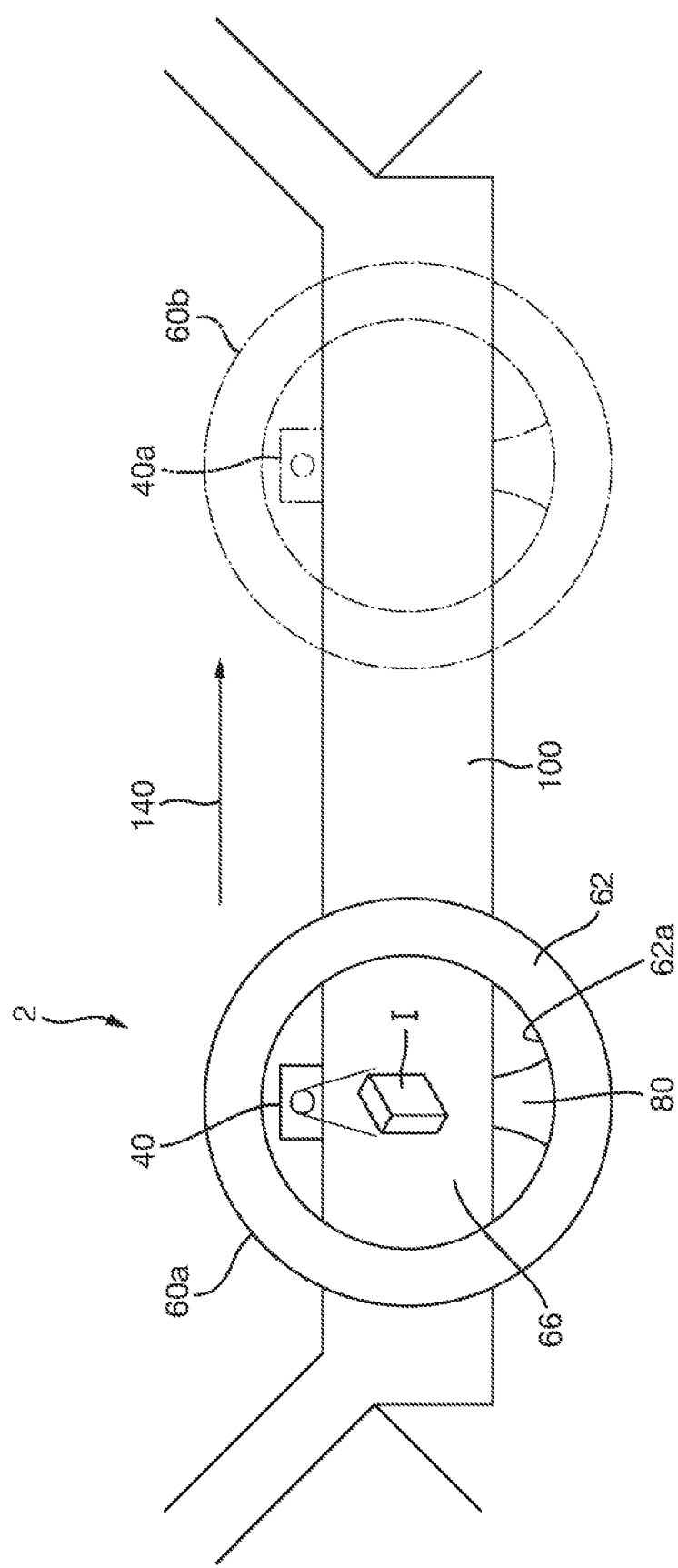

HOLOGRAPHIC DISPLAY SYSTEM

CROSS-REFERENCE TO RELATED APPLICATION

This application claims foreign priority benefits under 35 U.S.C. § 119(a)-(d) to GB Application 1613474.4, filed Aug. 4, 2016, which is hereby incorporated by reference in its entirety.

TECHNICAL FIELD

The present disclosure relates to a holographic display system for a motor vehicle and is particularly, although not exclusively, concerned with a holographic display system configured to provide one or more control interfaces of the vehicle.

BACKGROUND

Motor vehicles often comprise a large number of controls that an occupant may wish to interact with while operating the vehicle. Many of the controls may be relevant to driving the vehicle, such as indicator controls and exterior light controls. However, other controls may be provided for accessory systems of the vehicle, such as entertainment systems, navigation systems and climate control systems.

It is often desirable to provide controls for vehicle systems that are within easy reach of a driving position, in order to allow the driver to use the controls without departing from the driving position. This may lead to a large number of controls being provided within a small area of the vehicle. In some cases, in order to provide all of the controls for each of the vehicle systems, it may be necessary for a single control surface to be used to provide control inputs to more than one system of the vehicle.

Additionally, each of the systems may include a display configured to provide information regarding the operation of the system to the driver. It may be desirable to provide such displays within sight of the driver. For example, the displays may be provided on a dashboard of the vehicle in close proximity to one another. This may allow the driver to quickly gain desired information about the operation of any of the vehicle systems from the relevant display.

Providing a large number of controls and/or a large number of displays may undesirably increase the complexity of operating the vehicle and may restrict the driver's ability to quickly obtain desired information regarding the operation of a particular vehicle system. Furthermore, providing the controls and displays may increase clutter around the driver, which may detract from the experience of driving the vehicle.

SUMMARY

According to an aspect of the present disclosure, there is provided a display system for a motor vehicle comprising: a holographic projector assembly; and a steering wheel assembly, the steering wheel assembly comprising a ring-shaped member configured to be held by a driver of the vehicle and rotated about a central axis in order to steer the vehicle; wherein the holographic projector assembly is configured to produce a holographic image inside a central region about which the ring-shaped member circumferentially extends, e.g. at or towards a center of the ring-shaped member; wherein the ring-shaped member is movable, e.g. translatable or rotatable about a further axis, within the vehicle, e.g. relative to the interior trim portion, such that the ring-shaped member central axis is movable between first and second positions; and wherein the display system is configured such that the holographic image remains stationary relative to the ring-shaped member central axis as the ring-shaped member moves. The central axis may pass through the central region.

The holographic projector may be provided on or in an interior trim portion of the motor vehicle, such as a dashboard. In some arrangements, one or more components of the holographic projector assembly may be provided on the steering wheel assembly, e.g. on the ring-shaped member or a support arm of the steering wheel assembly.

The holographic projector assembly may comprise a mirror. The position and/or angle of the mirror may be controllable in order to adjust a location of the holographic image.

The steering wheel assembly may further comprise a support arm. The ring-shaped member may be coupled to an interior trim portion of the motor vehicle via the support arm. The mirror or a further mirror may be provided at an interface between the support arm and the interior trim portion.

The holographic projector assembly may comprise a pulse laser configured to emit pulses of laser light. For example, the pulse laser may be a femto-second laser configured to emit a pulse of laser light approximately every femto-second or less.

The holographic projector assembly may further comprise a scanner configured to selectively deflect the pulses of laser light, e.g. selectively deflect each pulse of laser light by a desired amount.

The holographic projector assembly may comprise one or more lenses, configured to focus the laser light to produce volume elements, e.g. voxels, of the holographic image. Additionally or alternatively, the holographic projector may comprise one or more non-planar mirrors configured to focus the laser light.

The laser may be configured to create a plasma in the volume elements of the holographic image. The plasma may create a pressure wave that may be sensed, e.g. felt, by an occupant's hand.

The pulse laser and the scanner of the holographic projector assembly may be provided within a housing of the holographic projector assembly. The lenses and/or mirrors of the holographic projector assembly may be provided within the housing. Additionally or alternatively, one or more of the lenses and/or mirrors may be provided outside of the housing. For example, one or more of the lenses and/or mirrors may be provided on or in an interior trim portion of the vehicle and/or the steering wheel assembly.

The holographic projector assembly may be configured to move together within the ring-shaped member, such that the holographic image remains stationary relative to the ring-shaped member central axis.

Additionally or alternatively, the mirror and/or the further mirror may be configured to move together with the ring-shaped member, such that the holographic image remains stationary relative to the ring-shaped member central axis. For example, the mirror and/or the further mirror may be mounted on the support arm of the steering wheel, which may move together with the ring-shaped member.

The display system may be configured such that the holographic image, or a portion of the holographic image, does not rotate as the ring-shaped member rotates about the central axis, e.g. the holographic image or a portion of the holographic image may remain stationary relative to the interior trim portion as the ring-shaped member rotates.

In some arrangements, the holographic image, or a portion of the holographic image, may rotate together with the ring-shaped member as the ring-shaped member rotates about the central axis, e.g. the holographic image, or a portion of the holographic image may remain stationary relative to the ring-shaped member as the ring-shaped member rotates.

The ring-shaped member may be movable between a first position and a second position. The holographic projector assembly may be configured to produce the holographic image when the ring-shaped member is positioned at or close to the first position, e.g. closer to the first position than the second position. The display system may comprise a further holographic projector assembly configured to produce the holographic image when the ring-shaped member is positioned at or close to the second position, e.g. closer to the second position than the first position.

The holographic image may be configured to represent one or more controls of the vehicle, such as indicator controls, navigation controls and/or media controls. The display system may be configured to vary the number and/or position of the controls represented by the holographic image according to a controls setting. The controls setting may be set by an occupant of the vehicle according to his or her control preferences. Additionally or alternatively, the controls setting may be at least partially determined according to an operating mode of the vehicle, such as manual control, autonomous control or semi-autonomous control.

The display system may further comprise a camera, e.g. a 3D camera, configured to determine a position, e.g. a 3D position, of a hand of an occupant of the vehicle relative to the holographic image. The display system may be configured to determine a control input based on the position of the occupant's hand relative to the holographic image.

The display system may further comprise an eye position sensor configured to determine a location of an eye of an occupant of the vehicle. The eye position sensor may be the camera. The display system may be configured to prevent the holographic image from being displayed when the occupant's eye is within a threshold distance of the holographic image. This may be done in order to protect the occupant's eye from infra-red and/or ultraviolet radiation from the holographic image and/or to prevent laser light entering the occupant's eye.

The display system may further comprise a location sensor, e.g. an ultrasound sensor, radar sensor, a camera, such as a 3D camera, or any other sensor, configured to determine locations of one or more objects in proximity to the vehicle, e.g. outside of the vehicle. The holographic image may be configured to display a representation of one or more of the objects.

The display system may further comprise a camera, e.g. a 3D camera, configured to capture an external image from the vehicle. The holographic image may comprise the external image. The camera may be the location sensor. Alternatively, the image captured by the camera may be combined with information from the location sensor to generate the representation of the objects.

The holographic projector assembly may be configured to display a portion of the holographic image radially outside of the ring-shaped member.

The display system may further comprise a controller configured to control the operation of the holographic projector assembly.

The controller may be configured to determine a control preference setting. The controller may be further configured to control the operation of the holographic projector assembly such that the holographic image represents one or more controls of the vehicle according to the control preference setting.

The controller may be configured to determine an operating mode of the vehicle. The controller may be further configured to control the operation of the holographic projector assembly, such that the holographic image represents one or more controls of the vehicle at least partially according to the vehicle operating mode.

The controller may be configured to determine a position of a hand of the occupant relative to the holographic image. The controller may be further configured to determine a vehicle control input based on the location of the occupant's hand.

The display system may be configured to reproduce information from another display of the vehicle within the holographic image.

The display system may further comprise a location sensor configured to determine the location of objects in proximity to the vehicle. The controller may be configured to process location information from the location sensor to generate a representation of the objects. The controller may be further configured to display the representation of the objects within the holographic image.

The display system may further comprise a camera. The controller may be configured to capture an external image from the vehicle using the camera. The controller may be further configured to display the external image within the holographic image.

According to another aspect of the present disclosure, there is provided a display system for a motor vehicle comprising: a holographic projector assembly wherein the holographic projector assembly is configured to produce a holographic image at or adjacent to a control surface of the motor vehicle.

The system may further comprise a mirror configured to reflect light produced by the holographic projector in order to adjust the position of the holographic image.

A vehicle, e.g. a motor vehicle, may comprise any of the above-mentioned display systems.

According to another aspect of the present disclosure, there is provided a method of operating a display system for a motor vehicle, the display system comprising: a holographic projector assembly; a steering wheel assembly, the steering wheel assembly comprising a ring-shaped member, configured to be held by an occupant of the vehicle and rotated about a central axis in order to steer the vehicle; and a controller, configured to control the operation of the holographic projector assembly; wherein the method comprises: controlling the operation of the holograph projector assembly to provide a holographic image inside a central region about which the ring-shaped member circumferentially extends, e.g. at or towards a center of the ring-shaped member. The central axis may pass through the central region.

The method may further comprise determining a control preference setting and controlling the operation of the holographic projector assembly such that the holographic image represents one or more controls of the vehicle according to the control preference setting.

The method may comprise determining an operating mode of the vehicle, for example a manual, autonomous or semi-autonomous operating mode of the vehicle. The operation of the holographic projector assembly may be controlled, such that the holographic image represents one or more controls of the vehicle at least partially according to the vehicle operating mode.

The method may further comprise determining a position of a hand of the occupant relative to the holographic image. A vehicle control input may be determined based on the location of the occupant's hand.

The method may further comprise reproducing information from another display of the vehicle within the holographic image.

The display system may further comprise a location sensor configured to determine the location of objects in proximity to the vehicle. The method may further comprise processing location information from the location sensor to generate a representation of the objects. The representation of the objects may be displayed within the holographic image.

The display system may further comprise a camera. The method may further comprise capturing an external image from the vehicle using the camera. The external image may be displayed within the holographic image. The external image may be combined with the location information to generate the representation of the objects.

For a better understanding of the present invention, and to show more clearly how it may be carried into effect, reference will now be made, by way of example, to the accompanying drawings, in the drawings:

BRIEF DESCRIPTION OF THE DRAWINGS

FIG. 2 is a schematic front view of a display system according to an arrangement of the present disclosure;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
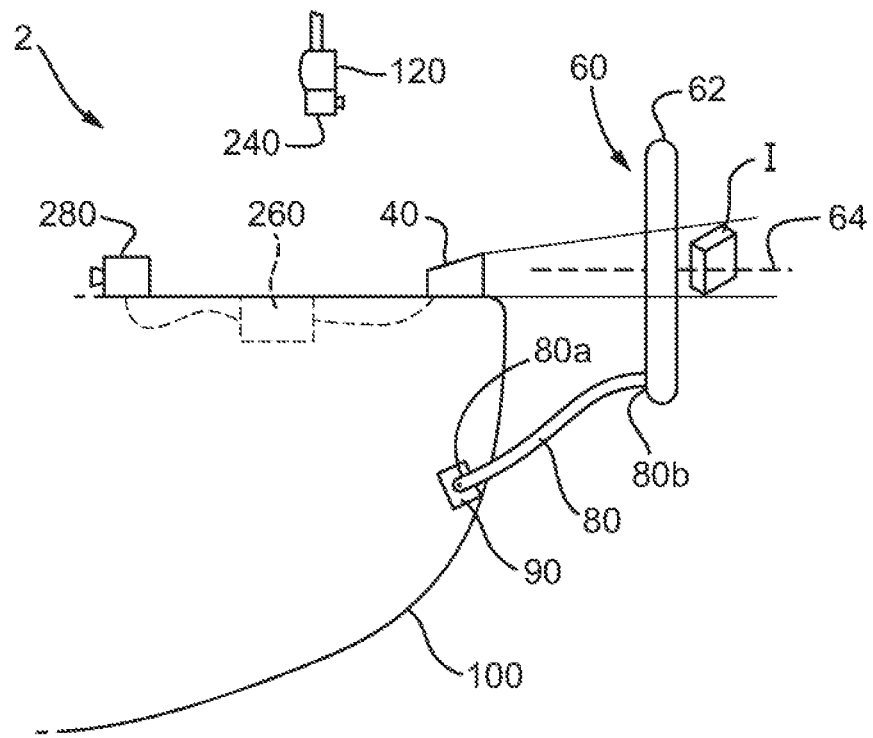
FIG. 1 is a schematic side view of a display system, according to arrangements of the present disclosure.

With reference to FIG. 1, a display system 2 for a motor vehicle comprises a holographic projector 40 and a steering wheel 60.

The steering wheel 60 is configured to rotate about a central axis 64 of the steering wheel. Such rotation may cause a steering system of the vehicle to control the direction of travel of the vehicle, for example by rotating wheels of the vehicle. The steering wheel 60 comprises a ring-shaped member 62 configured to be held by an occupant of the vehicle in order to rotate the steering wheel.

The ring-shaped member 62 may be circular and as such may be toroidal. The ring-shaped member 62 may also be circular in cross-section, although the cross-sectional shape may vary about the circumference of the ring-shaped member.

The steering wheel 60 may be a steer-by-wire steering wheel, which may not be mechanically linked to a steering mechanism of the vehicle. In other words, the steering wheel 60 may send an electrical signal to a controller, which in turn sends a signal to an actuator to adjust the directional position of wheels of the vehicle. The steering wheel 60 may be operatively connected to such a controller wirelessly and/or by virtue of one or more wires.

The steering wheel 60 is supported by a support arm 80, which may connect the steering wheel 60 to a support structure, such as a dashboard 100 or other interior trim portion of the vehicle. As depicted in FIG. 1, a first end 80a of the support arm is coupled to the dashboard 100 and a second end 80b of the support arm is coupled to the steering wheel 60. The support arm 80 is coupled to the steering wheel 60 at the second end 80b in such a way as to permit rotation of the ring-shaped member 62.

The support arm 80 may comprise a boss 90 provided at the first end 80a of the support arm and the support arm 80 may be coupled to the dashboard 100 at the boss 90.

The support arm 80 may connect to the steering wheel 60 at a point that is spaced apart from the center of the steering wheel. For example, the support arm 80 may connect to the steering wheel 60 at the bottom of the steering wheel 60. As depicted in FIG. 1, the support arm 80 may couple to the ring-shaped member 62 of the steering wheel.

The support arm 80 may extend away from the steering wheel 60 in a direction with a component parallel to the central axis 64 of the steering wheel 60. The support arm 80 may also extend away from the steering wheel 60 in a direction with a radial component. In other words, the support arm 80 may extend axially and radially away from the central axis 64. The support arm 80 may be substantially straight or as shown, the support arm 80 may be curved, e.g. with a point of inflection between the first and second ends 80a, 80b. The support arm 80 may be elongate.

When the support arm 80 is coupled to the ring-shaped member 62, as depicted in FIG. 1, the steering wheel 60 may not comprise any support members radially inside the ring-shaped member 62, e.g. in order to support rotation of the steering wheel 60 about the central axis 64. In other words the steering wheel 60 may be a hubless steering wheel.

As depicted in FIG. 2, the ring-shaped member 62 may define a void 66 inside of the ring-shaped member, e.g. inside of an inner radius 62a of the ring-shaped member. The holographic projector 40 may be configured to generate a holographic image I within the void 66, e.g. between a center of the ring-shaped member 62 and the inner radius 62a of the ring-shaped member.

In an alternative arrangement, the steering wheel 60 may comprise a central hub to which the support arm 80 may connect. The steering wheel 60 may comprise one or more support members configured to couple the ring-shaped member 62 to the central hub. In this case, the holographic projector 40 may be configured to generate the holographic image I in an area radially inside of the ring-shaped member 62 in which the support members are not provided, e.g. between, in front of and/or behind the support members.

In the arrangement depicted in FIG. 1, the holographic image I is depicted in front of the steering wheel 60, e.g.

offset from the ring-shaped member 62 along the central axis 64 of the steering wheel 60. However, the holographic image I may be generated at any desirable position along the central axis 64, for example, the holographic image I may be at least partially aligned within the ring-shaped member 62 or may be provided behind the ring-shaped member 62, e.g. between the steering wheel 60 and the dashboard 100. The holographic image I may extend any desired distance along the central axis 64, e.g. in front of and/or behind the ring-shaped member 62.

In the arrangement depicted in FIG. 1, the holographic projector 40 is mounted on the dashboard 100. However, it is equally envisaged that the holographic projector 40 may be mounted on any other interior trim portion or component of the vehicle. For example, the holographic projector 40 may be mounted on a rear view mirror 120. In alternative arrangements of the present disclosure, the holographic projector 40 or components of the holographic projector may be provided on the boss 90, the support arm 80 and/or the steering wheel 60. For example, components of the holographic projector 40 could be provided on the ring-shaped member 62.

Figure 3:
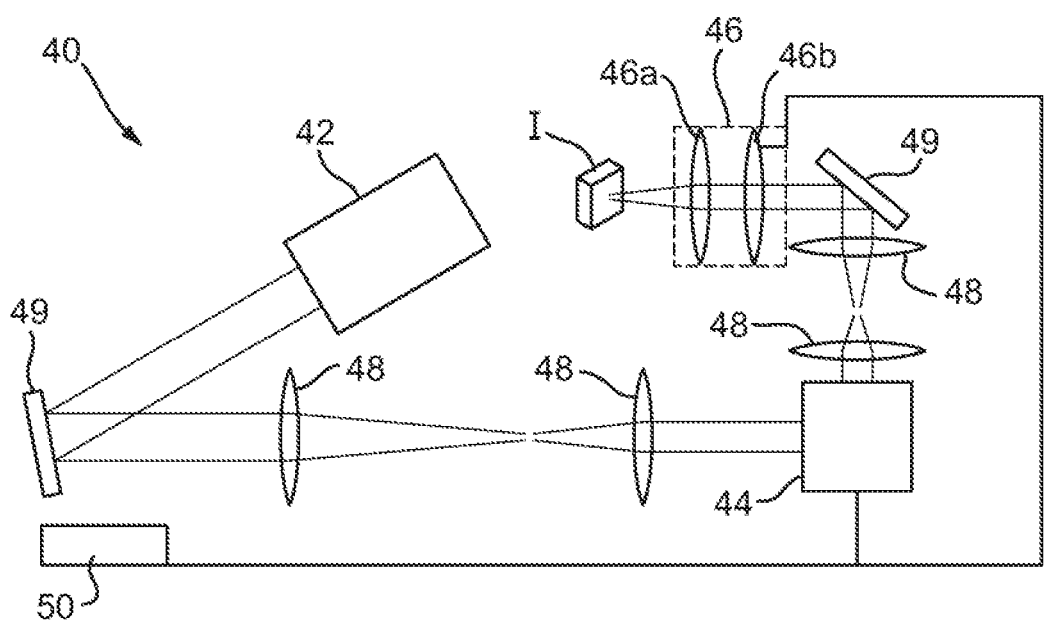
FIG. 3 is a schematic view of holographic projector according to arrangements of the present disclosure.

With reference to FIG. 3, the holographic projector 40 may comprise a light source, such as a laser 42, a scanner 44, configured to selectively deflect light from the laser, and a varifocal lens 46, configured to focus light from the laser to create the holographic image. The holographic projector 40 may further comprise a controller 50, configured to control the operation of the scanner 44 and/or the varifocal lens 46.

The holographic projector 40 may further comprise one or more mirrors 49 and/or one or more lenses 48. The mirrors 49 and/or lenses 48 may be provided between the components of the holographic projector, e.g. between the laser 42 and the scanner 44, and/or between the scanner 44 and the varifocal lens 46, with respect to the passage of the laser light. The mirrors 49 and/or lenses 48 may be configured to direct and/or focus the laser light as it passes between the components of the holographic projector 40. In the arrangements shown in FIG. 3, the mirrors 49 are planar mirrors configured to direct the laser light within the holographic projector 40. However, it is equally envisaging that the mirrors 49 may be concave or convex mirrors and may also be configured to focus the laser light.

Each of the components of the holographic projector 40, e.g. the laser 42, the scanner 44, the varifocal lens 46, the mirrors 49 and the lenses 48 may be provided within a housing (not shown) of the holographic projector 40. Alternatively, one or more of the components of the holographic projector 40, such as the lenses 48, mirrors 49 and/or the varifocal lens 46 may be provided outside of the housing of the holographic projector. For example, the lenses 48, mirrors 49 and/or the varifocal lens 46 may be provided on or in an interior trim portion of the vehicle, e.g. between the holographic projector 40 and the steering wheel 60, and/or may be provided on or in the steering wheel 60, support arm 80 and/or boss 90.

The laser 42 may be a pulse laser configured to generate pulses of laser light. For example, in the arrangement shown in FIG. 3, the laser comprises a femtosecond laser configured to generate a pulse of laser light approximately every femtosecond. It is equally envisaged that the pulse laser may be configured to generate a laser pulse over a different time period, such as a nanosecond, a picosecond, an attosecond or any other time period.

The scanner 44 may comprise a plurality of mirrors (not shown), the mirrors being movable in order to selectively deflect the light. Additionally or alternatively, the laser scanning device may comprise one or more refractive elements (not shown) configured to deflect the laser light through refraction. The scanner 44 may be capable of adjusting the position of the mirrors and/or refractive elements to deflect each pulse of light generated by the laser 42 by a different amount. In some arrangements, the scanner 44 may be a Galvano scanner. Alternatively, the scanner 44 may comprise any other form of scanning device capable of controllably deflecting light from the laser 42.

Laser light leaving the scanner 44 may be deflected by the mirrors 49 and/or focused by the lenses 48 before reaching the varifocal lens 46. The mirrors 49 and/or lenses 48 may be configured to preserve the relative deflections of the laser light pulses that have been caused by the scanner 44.

The varifocal lens 46 may comprise a plurality of lenses 46a, 46b, the relative positions of which being controllable in order to adjust a focal length of the varifocal lens 46. By controlling the operation of the scanner 44 and the varifocal lens 46, the holographic projector 40 may be configured to direct and focus the pulses of laser light from the laser 42 at a desired 3D location, e.g. into a desired volume centered at the 3D location.

Pulses of laser light focused at the desired 3D location may cause air at the 3D location to become ionized and form a plasma. The plasma may produce visible light and may thereby form a volume element (voxel) of the holographic image I. Production of the plasma may also lead to the generation of pressure waves within the air adjacent to the desired 3D location, which may propagate away from the volume element. The pressure waves may be felt by the occupant when an occupant's hand is close to the volume elements, which may enable the occupant to feel the holographic image I.

The controller 50 may control the operation of the scanner 44 and the varifocal lens 46 to scan the laser over a projection volume in order to generate the holographic image I within the projection volume. The varifocal lens 46 may be capable of providing small and accurate changes to its focal length, in order to scan the laser over the projection volume.

In some arrangements, the varifocal lens 46 may be capable of adjusting its focal length by an amount greater than the depth of the projection volume, e.g. in order to focus the laser light outside of a current projection volume. Additionally or alternatively, the scanner 44 may be capable of deflecting the laser light outside of the current projection volume. The size and/or position of the projection volume may therefore be adjusted by varying the operation of the scanner 44 and the varifocal lens 46.

In other arrangements, the scanner 44 and/or the varifocal lens 46 may not be capable of directing and/or focusing the laser light outside of the current projection volume. Alternatively, the position of the projection volume may already have been adjusted to a limit of the scanner 44 or the varifocal lens 46. Hence, if it is desirable to adjust or further adjust the size and/or position of the projection volume, the position of the lenses 48 and/or mirrors 49 of the holographic projector 40 may be varied. Changes to the projection volume that are provided by adjusting the lenses 48 and/or mirrors 49 may not be performed as quickly as changes implemented by adjusting the operating of the scanner 44 and/or the varifocal lens 46. However, adjusting the positions of the lenses 48 and/or the mirrors 49 may allow larger changes to be made to the size and/or position of the projection volume. The positions of the lenses 48 and/or mirrors 49 may be adjusted by one or more actuators (not shown) provided within the holographic projector 40. The actuators may be controlled by the controller 50.

Figure 4A:
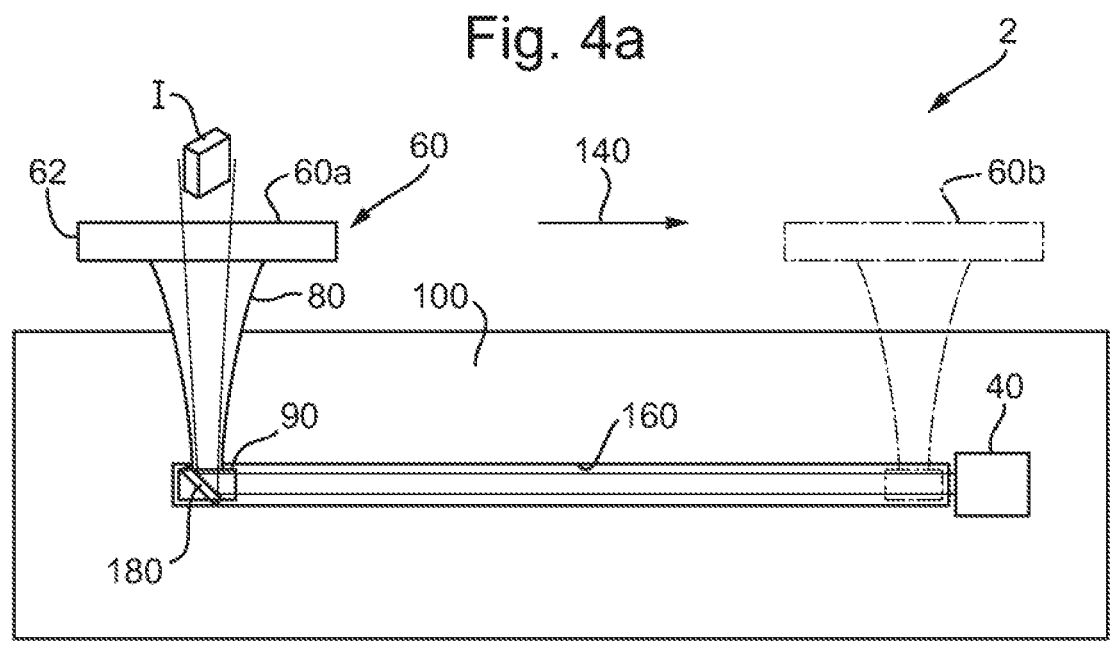
FIGS. 4A and 4B is are schematic bottom and side views respectively of a display system according to another arrangement of the present disclosure.

As depicted in FIGS. 2 and 4A, the steering wheel 60 may be movable relative to the dashboard 100 from a first position 60*a* to a second position 60*b*, in which a second occupant of the vehicle may steer the steering wheel 60. In other words, the steering wheel 60 may move in a lateral direction 140 of the vehicle from one end of the dashboard 100 to another end of the dashboard. Control of the vehicle may thus be passed from a first occupant to the second occupant of the vehicle. Other systems of the vehicle may adapt for the second occupant to control the vehicle. For example, pedals may extend from the floor of the footwell and mirrors may be adjusted so that the new driver has appropriate views.

As depicted in FIG. 2, the vehicle may comprise a track 160 provided within the interior trim portion of the vehicle. The track 160 may extend across the dashboard 100 in the lateral direction 140. In particular, the track 160 may extend between the first position 60*a* and the second position 60*b*. The boss 90 may be coupled to the dashboard 100 at the track 160 and may be configured to slide in the track 160 to allow the steering wheel 60 to be moved between the first and second positions 60*a*, 60*b*.

When the steering wheel 60 moves between the first position 60*a* and the second position 60*b*, it may be desirable for the holographic image I to be displayed in the same position relative to the steering wheel 60 regardless of the position of the steering wheel 60.

The holographic projector 40 may be configured to provide the holographic image I when the steering wheel 60 is located at or close to the first position 60*a*, e.g. closer to the first position 60*a* than the second position 60*b*. The display system 2 may comprise a further holographic projector 40*a* configured to generate the holographic image I when the steering wheel 60 is at or close to the second position 60*b*, e.g. closer to the second position 60*b* than the first position 60*a*.

At intermediate positions between the first and second positions 60*a*, 60*b*, neither the holographic projector 40 nor the further holographic projector 40*a* may be capable of producing the holographic image I in the desired position, e.g. relative to the steering wheel 60. For example, the arrangements of the mirrors and lenses within the holographic projectors 40, 40*a* may not allow the laser light from the holographic projectors 40, 40*a* to be deflected and/or focused into the void 66 of the steering wheel. In such intermediate positions, the holographic image I may not be provided and may not be visible.

In order to allow the holographic image I to be provided in the desired position relative to the steering wheel 60 at intermediate positions between the first and second positions 60*a*, 60*b*, one or more additional holographic projectors (not shown) may be provided within the display system 2, The additional holographic projectors 40 may be coupled to the dashboard 100 between the holographic projector 40 and the further holographic projector 40*a* and may be configured to generate the holographic image I when the steering wheel 60 is location at an intermediate position between the first and second positions 60*a*, 60*b*. Alternatively, the display system 2 depicted in FIGS. 4A and 4B may be provided.

Figure 4B:
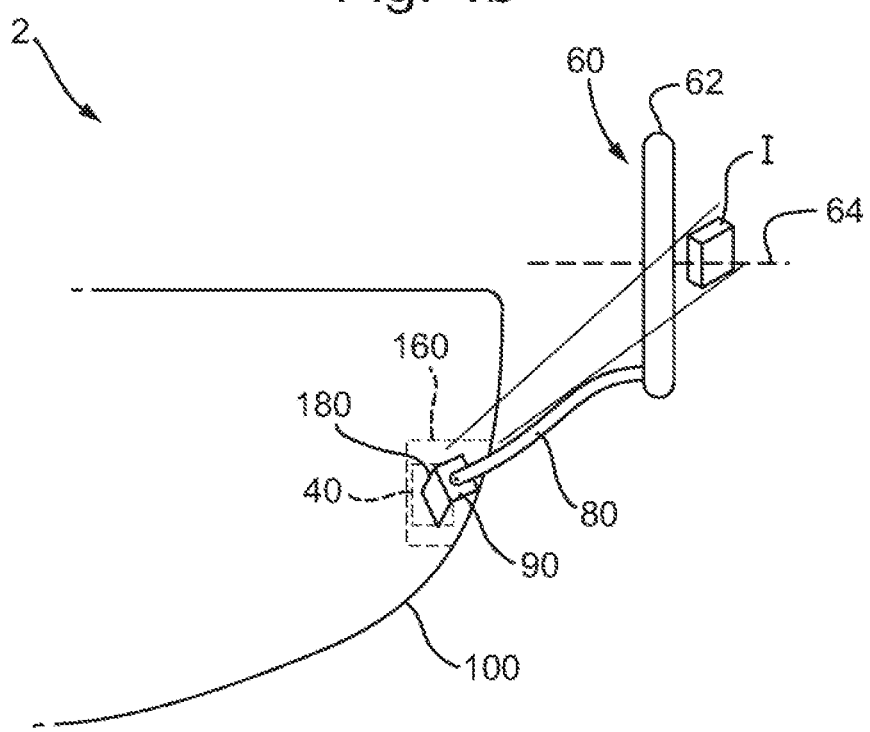

In the arrangement shown in FIGS. 4A and 4B, a single holographic projector may be provided. The holographic projector 40 may be provided at one side of the dashboard 100 and may be configured to project the laser light in the lateral direction 140. The holographic projector 40 may be configured to project the laser light in a direction that is substantially parallel with the track 160. For example, in the arrangement shown in FIGS. 4A and 4B, the holographic projector 40 is configured to project the laser light along the track 160.

The display system 2 further comprises a movable mirror 180. The movable mirror 180 may be movable together with the steering wheel 60 as the steering wheel moves between the first position 60*a* and the second position 60*b*. As depicted in FIGS. 4A and 4B, the movable mirror 180 may be provided on the boss 90. Alternatively, the movable mirror 180 may be provided on the support arm 80. Alternatively again, the movable mirror 180 may be coupled to any other component configured to move together with the steering wheel 60.

The movable mirror 180 may be a mirror 49 of the holographic projector 40 depicted in FIG. 3. Alternatively, the movable mirror 180 may be provided in addition to the mirrors 49 provided within the holographic projector 40.

As shown in FIGS. 4A and 4B, the movable mirror 180 may be configured to reflect the laser light from the holographic projector 40 towards the steering wheel 60, to allow the holographic image I to be formed within the void 66, e.g. radially inside the ring-shaped member 62.

As the holographic projector 40 is configured to project the laser light in a direction parallel to the track 160, the laser light from the holographic projector 40 may be incident on the movable mirror 180 regardless of the position of the steering wheel 60. The display system 2 may thereby be configured to provide the holographic image I at a desired location relative to the steering wheel 60 when the steering wheel 60 is located in any position between the first and second positions 60*a*, 60*b*.

As described above, the holographic projector 40 creates the holographic image I by scanning the pulses of laser light over the projection volume. The projection volume may be formed at a predetermined projection distance from the holographic projector 40, which may be determined by the arrangement of the mirrors 49 and the lenses 48 within the holographic projector 40.

As the steering wheel 60 moves between the first and second positions 60*a*, 60*b*, the distance travelled by the laser light between the holographic projector 40 and the ring-shaped member 62 of the steering wheel may change, e.g. reduce. Hence, it may be desirable to adjust the operation of the holographic projector 40 to reduce the projection distance by a corresponding amount, such that the holographic image I is formed at the same location relative to the steering wheel 60 regardless of the location of the steering wheel 60.

The display system 2 may comprise one or more sensors (not shown) configured to determine the position of the steering wheel 60 between the first and second positions 60*a*, 60*b*. For example, the display system 2 may comprise a potentiometer provided along the track 160. A first contact of the potentiometer may be provided at a first end of the track and a second contact of the potentiometer may be provided on the boss 90, such that an electrical resistance between the first and second contacts varies as the steering wheel 60 is moved between the first and second positions 60*a*, 60*b*.

The position of the steering wheel 60 determined by the sensors may be input to the controller 50 of the holographic projector 40, which may adjust the varifocal lens 46 and/or the position of the lenses 48 and/or mirrors 49 accordingly, e.g. such that the position of the holographic image I is unchanged relative to the steering wheel 60.

As described above, the ring-shaped member 62 of the steering wheel may be rotated by the occupant about the central axis 64 in order to steer the vehicle. In contrast to when the steering wheel is translated between the first and second positions 60a, 60b, when the ring-shaped member is rotated, it may be desirable for the holographic image, or a portion of the holographic image, not to rotate together with the ring-shaped member 62. In other words, it may be desirable for the holographic image I, or a portion of the holographic image, to remain stationary relative to the dashboard 100 as the ring-shaped member 62 rotates.

In some arrangements, it may be desirable that the holographic image I, or a portion of the holographic image, does rotate together with the ring-shaped member 62. In this case, the controller 50 may determine an angle of rotation of the ring-shaped member 62 and may adjust the operation of the holographic projector 40 to adjust the position and/or orientation of the holographic image I or portion of the holographic image accordingly.

Figure 5A:
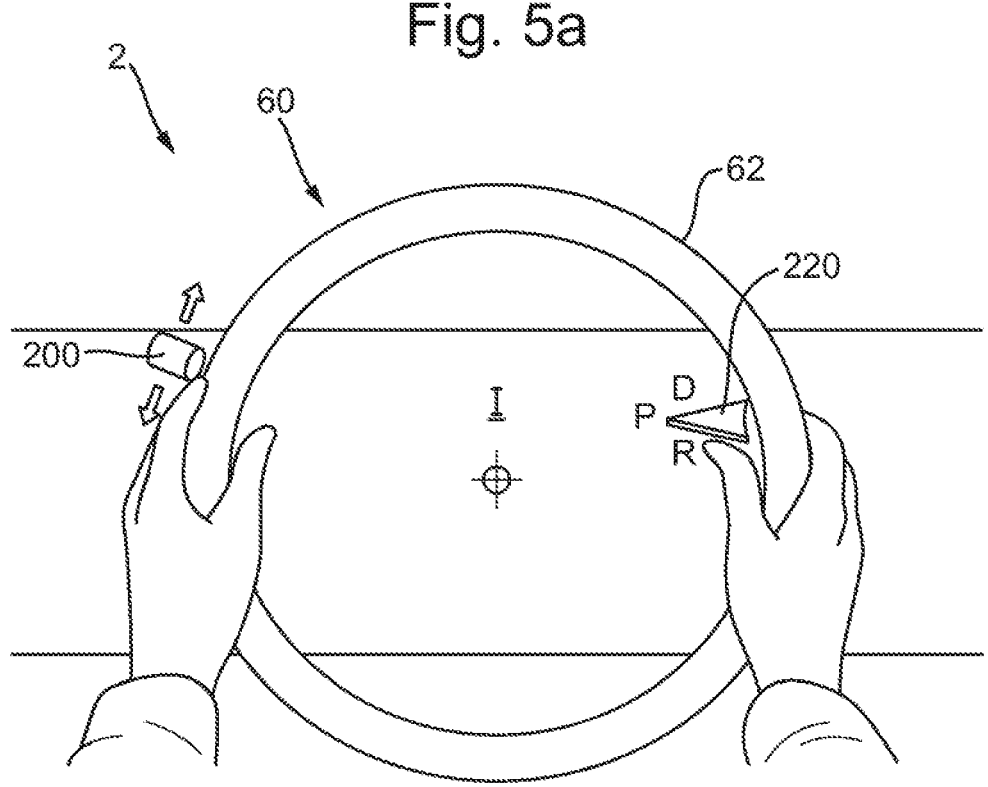
FIG. 5A shows the holographic display system, according to arrangements of the present disclosure, in a first operating mode.

In the arrangements described above, the holographic image I is formed inside a central region of the ring-shaped member 62. However, it is also envisaged that the holographic image I or a portion of the holographic image may be formed outside of the ring-shaped member 62, e.g. outside an outer radius of the ring-shaped member. For example, at least part of the holographic image I may be formed adjacent to the steering wheel 60, as shown in FIG. 5A. Alternatively, the holographic image I may be formed at another location within the vehicle, e.g. within a cabin of the vehicle, away from the steering wheel 60. For example, the holographic image I may be formed adjacent to another physical driving control of the vehicle or another interior trim portion of the vehicle, such as a center console.

With reference to FIG. 5A, the holographic image I may be configured to represent one or more controls of the vehicle. For example, as shown in FIG. 5A, the holographic image I may be configured to represent an indicator control 200 and/or a transmission control 220. Additionally or alternatively, the holographic image I may be configured to represent one or more displays relating to the operation of the vehicle or one or more accessory systems of the vehicle, such as an entertainment system or a climate control system of the vehicle.

As shown in FIG. 1, the display system 2 may further comprise a camera 240 configured to capture an image of an occupant of the vehicle. The camera 240 may be a 3D camera. The 3D camera may comprise two or more cameras, and a controller configured to combine images captured by the cameras to generate a 3D image. Alternatively, the 3D camera may comprise a camera, a distance sensor and a controller. The camera may be configured to capture a 2D image and the distance sensor may be configured to determine the distance of objects in the 2D image from the camera. The controller may combine the 2D image and the distances from the distance sensor to generate the 3D image. Alternatively again, the camera 240 may comprise any other camera or camera system capable of capturing a 3D image.

The image, e.g. the 3D image, captured by the camera 240 may be processed by a controller 260 of the display system 2 to determine a position, e.g. a 3D position, of an occupant's hand relative to the holographic image I. The controller 260 may determine, based on the position of the occupant's hand, that the occupant is interacting with, e.g. touching, one or more of the controls represented by the holographic image I. The controller may generate a control input based on the position of the occupant's hand.

The control input may be communicated by the controller 260 to a relevant system of the vehicle. The control input may be communicated to the relevant system wirelessly and/or via one or more wires.

Additionally or alternatively, the camera 240, or another camera or sensor provided in the display system 2, may be configured to determine a location of an eye of the occupant. The controller 260 may determine the distance between the occupant's eye and the holographic image I and may prevent the holographic image I from being displayed when the occupant's eye is within a threshold distance of the holographic image I. In this way the controller 260 may prevent laser light from the holographic projector 40 reaching the occupant's eye.

The type, number and/or position of the controls provided by the holographic image I may be determined according to a controls setting. The controls setting may be set by the occupant according to his or her preferences. For example, a first occupant's preference may be to simplify the controls provided in the vehicle while they are driving the vehicle. The first occupant may set the controls setting such that a minimum number of controls are provided, e.g. the controls that are required for operating the vehicle. A second occupant may wish to be able to control one or more accessory systems of the vehicle using controls provided in the holographic image I and may set the controls setting accordingly. For example, the second occupant may wish to control an entertainment system of the vehicle by interacting with the holographic image.

The controls setting may be at least partially determined according to an operating mode of the vehicle, for example whether the vehicle is operating in a manual driving mode, an autonomous driving mode or a semi-autonomous driving mode.

In the arrangement depicted in FIG. 5A, the vehicle is operating in the manual driving mode. In the manual driving mode, the controls setting may be configured such that representations of each of the controls and/or displays necessary for operating the vehicle (which may or may not be provided by other, e.g. physical, controls and/or displays of the vehicle) are provided within the holographic image I. Additionally, when the vehicle is operating in the manual driving mode, the controls setting may be configured to omit any controls or displays that may distract the driver from operating the vehicle.

Figure 5B:
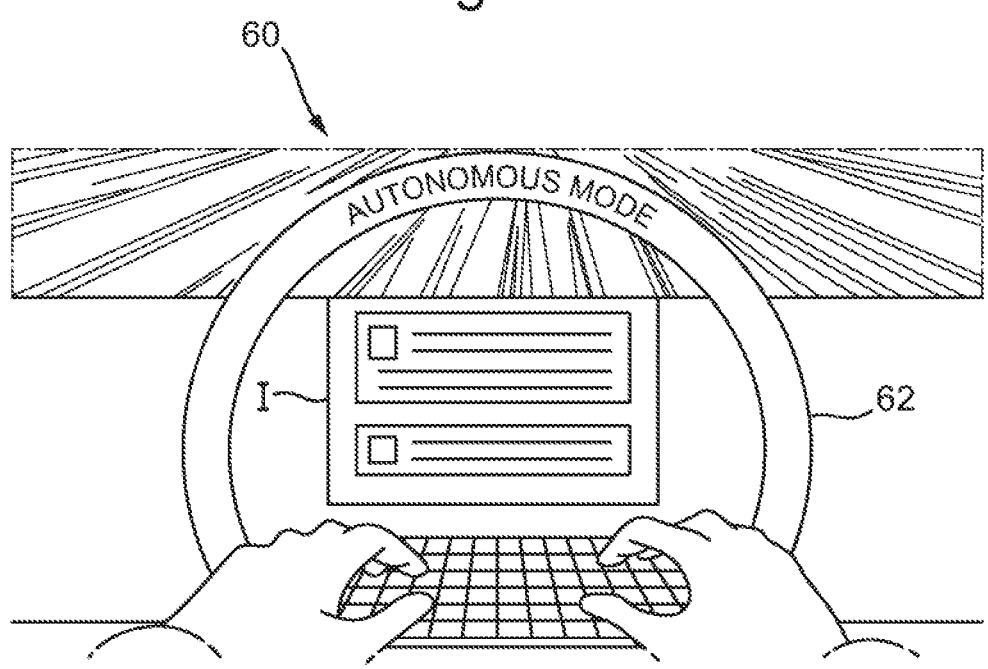
FIG. 5B shows the holographic display system, according to arrangements of the present disclosure, in a second operating mode.

In the arrangement depicted in FIG. 5B, the vehicle is operating in the autonomous driving mode. In the autonomous driving mode, the controls setting may not be set to include any of the driving controls or displays, e.g. by default, and the occupant may be capable of adjusting the controls setting to provide any desirable controls and/or displays. As depicted in FIG. 5B, the display system 2 may be configured to provide a display for a computing device provided in the vehicle and controls, such as a keyboard, for operating the computing device.

As depicted in FIG. 1, the display system 2 may further comprise an exterior positon sensor 280, configured to determine the location of objects outside of the vehicle, such as other vehicles and/or other objects in proximity to the vehicle.

The exterior position sensor 280 may comprise an ultrasound sensor, a radar sensor or any other type of sensor. For example, the exterior position sensor 280 may comprise a camera, such as a 3D camera.

The exterior position sensor 280 may provide object position data captured by the sensor to the controller 260 or another controller. The controller 260 may process the object positon data to generate a representation, e.g. a 3D representation, of one or more objects in proximity to the vehicle.

If the exterior position sensor 280 comprises a camera, the representation may be the image captured by the camera. Alternatively, the image captured by another camera may be combined with position data captured by the exterior position sensor 280 to generate the representation.

Figure 6:
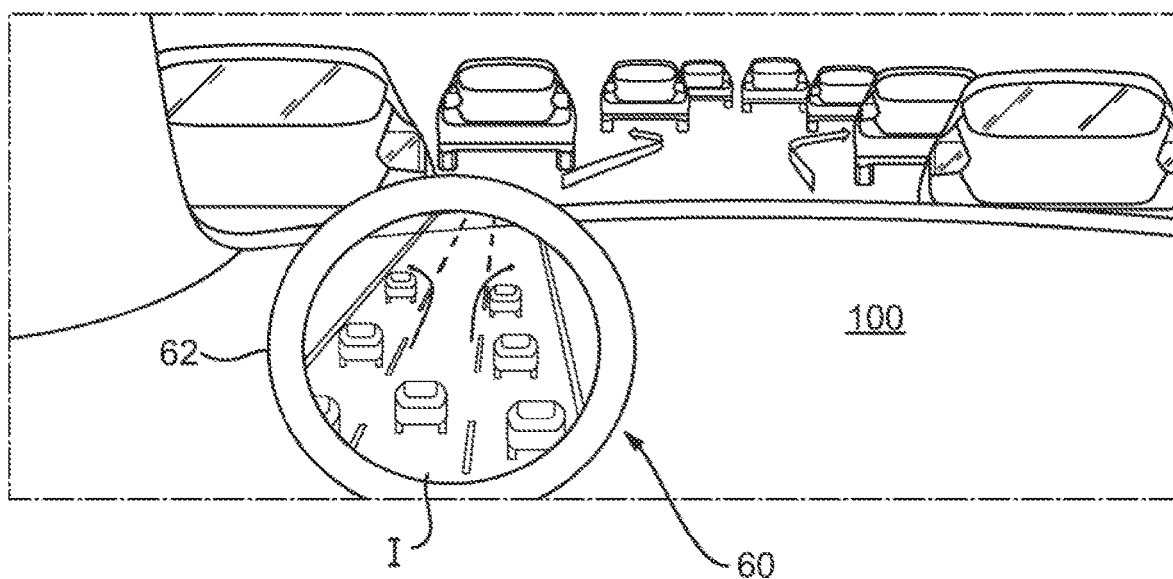
FIG. 6 shows the holographic display system, according to arrangements of the present, in a third operating mode.

As depicted in FIG. 6, the holographic projector 40 may be configured to produce the representation of the objects within the holographic image I. In the arrangement depicted, the display system 2, e.g. the exterior position sensor 280, the controller 260 and the holographic projector 40 of the display system 2, is configured to provide a representation of other vehicles ahead of the vehicle. However, it is equally envisaged, that the display system 2 may additionally or alternatively be configured to provide a representation of other vehicles and/or objects to the rear of the vehicle and/or to the sides of the vehicle.

The objects to be represented within the holographic image I and/or the extent of an area around the vehicle to be represented may be selected by the occupant. Additionally or alternatively, the objects represented within the holographic image I may be determined according to a direction of travel of the vehicle and/or a maneuver being performed by the vehicle.

The vehicle may further comprise one or more further display systems, such as display panels or head up displays. The further display systems may not be configured to allow the occupant to interact with the displays in the same way as the display system 2. For example, the further display systems may not be capable of determining a control input based on the position of the occupant's hand relative to an image provided by the further display system.

In this case, the occupant may wish to transfer the image or information being displayed on one or more of the further display systems to the display system 2, e.g. to allow the occupant to interact with the image or information using the display system 2. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle display system comprising:
   a steering wheel being laterally movable along a track between first and second positions with respect to a dashboard, and including, a ring defining, a void configured to rotate about a central axis;
   a support arm having a first end coupled with the ring and a second end movably attached to the track; and
   a projector including a mirror attached to the support arm, wherein the projector is configured to project a laser light in a lateral direction in parallel with the track toward the mirror, and the mirror is configured to reflect the laser light toward the void to generate a holographic image inside the void such that the holographic image remains stationary relative to the central axis as the steering wheel moves between the first and second positions.

2. The display system of claim 1, wherein a position or angle of the mirror is controllable to adjust a location of the holographic image.

3. The display system of claim 1, wherein the projector includes a pulse laser configured to emit pulses of the laser light, a scanner configured to selectively deflect the pulses of the laser light, and one or more lenses configured to focus the laser light to produce volume elements of the holographic image.

4. The display system of claim 3, wherein the pulse laser is configured to use plasma in a volume element of the holographic image to create a pressure wave sensed by a hand of an occupant.

5. The display system of claim 1, wherein the holographic image represents one or more vehicle controls, and the projector is further configured to vary a number or position of the one or more controls according to a controls setting.

6. The display system of claim 1 further comprising a camera configured to determine a position of a hand of an occupant relative to the holographic image, and determine a control input based on the position of the hand relative to the holographic image.

7. The display system of claim 1 further comprising an eye position sensor configured to determine a location of an eye of an occupant, wherein the projector is further configured to prevent the holographic image from being displayed when the eye is within a threshold distance of the holographic image.

8. The display system of claim 1 further comprising a location sensor configured to determine locations of one or more objects, wherein the holographic image is configured to display a representation of the one or more objects.

9. The display system of claim 1 further comprising a camera configured to capture an external image, wherein the holographic image displays the external image.

10. The display system of claim 1, wherein the projector is further configured to display a portion of the holographic image radially outside of the ring.

11. The display system of claim 1 further comprising a controller configured to:
    determine a control preference setting; and
    control the projector such that the holographic image represents one or more controls according to the control preference setting.

12. The display system of claim 1 further comprising a controller configured to:
    determine a vehicle operating mode, wherein the operating mode includes a manual driving mode and an autonomous driving mode; and
    control the projector such that
    in the manual driving mode, the projector projects a holographic image representing a transmission selector, and
    in the autonomous driving mode the projector omits the holographic image representing the transmission selector and projects a holographic image representing a computer input device.

13. The display system of claim 1 further comprising a controller configured to:
    determine a position of a hand of an occupant relative to the holographic image; and
    determine a vehicle control input based on the position of the hand.

14. A vehicle comprising:
    a projector configured to produce a holographic image;
    a steering wheel having a ring configured to rotate about a central axis and configured to move laterally between first and second positions relative to a dashboard of the vehicle, wherein the ring defines a void, the holographic image is projected in the void defined with a circumference of the ring and remains stationary relative to the central axis as the ring moves between the first and second positions; and a controller configured to, in response to indication of an operating mode, control the projector such that the holographic image represents one or more controls of the vehicle at least partially according to the operating mode.

15. A vehicle steering wheel assembly comprising:
a ring configured to rotate about a central axis and move laterally, relative to a vehicle dashboard, between first and second positions, wherein the ring defines a void;
a first projector configured to project a holographic image inside the void responsive to the ring being at the first position,
a second projector, configured to project a same holographic image inside the void responsive to the ring being at the second position; and
a controller configured to, in response to indication of a control preference setting, control the first and second projector such that the holographic image represents one or more controls according to the control preference setting.

16. The vehicle steering wheel assembly of claim 15, wherein the controller is further configured to, in response to a position of a hand relative to the holographic image, select a control input from the one or more controls within the control preference setting, and wherein the control input is based on the location of the position of the hand.

17. The vehicle of claim 14, wherein the operating mode includes a manual driving mode and an autonomous driving mode, and wherein the controller is further configured to, responsive to the manual driving mode, project a holographic image representing an indicator control.

18. The vehicle of claim 17, wherein the controller is further configured to, responsive to the autonomous driving mode, omit the holographic image representing the indicator control and project a holographic image representing a computer device.

* * * * *